United States Patent [19]

Smith

[11] Patent Number: 5,193,432
[45] Date of Patent: Mar. 16, 1993

[54] TAMPER-RESISTANT BRAKE ACTUATOR

[75] Inventor: John P. Smith, Grand Rapids, Mich.

[73] Assignee: Anchorlok Corp., Muskegon, Mich.

[21] Appl. No.: 875,998

[22] Filed: Apr. 29, 1992

[51] Int. Cl.⁵ ............................................. F01B 7/00
[52] U.S. Cl. .................................. 92/63; 92/130 R; 403/338; 403/373
[58] Field of Search ............... 92/48, 63, 64, 130 R, 92/98 R; 403/335, 338, 373; 29/888.06

[56] References Cited

U.S. PATENT DOCUMENTS

| | | | |
|---|---|---|---|
| 3,935,620 | 2/1976 | Carton | 92/63 |
| 4,565,120 | 1/1986 | Gray et al. | 92/130 R |
| 4,850,263 | 7/1989 | Rumsey et al. | 92/63 |
| 4,860,640 | 8/1989 | Ware | 92/63 |
| 4,960,036 | 10/1990 | Gummer et al. | 92/63 |
| 5,002,164 | 3/1991 | Bowyer | 92/63 |
| 5,067,391 | 11/1991 | Choinski et al. | 92/63 |
| 5,094,560 | 3/1992 | Gautier et al. | 403/338 |
| 5,105,727 | 4/1992 | Bowyer | 92/63 |

FOREIGN PATENT DOCUMENTS 13329 of 1897 United Kingdom ............... 403/338

OTHER PUBLICATIONS

Lear Siegler Truck Products Corp. undated flyer regarding Anchorlok Gold Seal Spring Brake.

Primary Examiner—Thomas E. Denion
Attorney, Agent, or Firm—Varnum, Riddering, Schmidt & Howlett

[57] ABSTRACT

An air-operated combination diaphragm spring brake has a tamper-resistant clamp provided between a head (46) and a spring side of a flange case (18) which together form a spring chamber (16) housing a power spring (72). The head (46) has an annular rim (70), and the flange case has an annular flange (74) with a diaphragm (48) sandwiched therebetween in an interface (76). An annular retaining member (78) has a lip (86) which tightly captures a step (80) on the annular rim as the annular retaining member (78) is drawn over the interface (76) to form the tamper-resistant clamp.

18 Claims, 6 Drawing Sheets

TAMPER-RESISTANT BRAKE ACTUATOR

BACKGROUND OF THE INVENTION

1. Field of the Invention

This invention relates to an improvement in air-operated combination diaphragm spring brake actuators of the type used with air brake systems on vehicles such as trucks. In one of its aspects, the invention relates to a spring brake actuator having a tamper-resistant spring chamber.

2. State of the Prior Art

Spring-applying brake actuators are in common use with air brake systems used on trucks, buses, and towed vehicles. Such actuators are normally provided with a service chamber for normally applying and releasing the brakes in response to delivery and exhaust of compressed air, and a spring chamber disposed in tandem with the service chamber for providing parking or emergency brake functions. A spring brake actuator uses spring force to operate a service brake actuator and apply brakes when pressurized air in the spring chamber is reduced below some predetermined level. Air pressure may be reduced in the spring chamber to apply the brakes under the control of the operator or automatically as a result of failure of the air system. The service chamber and spring chamber are separated by an adapter or flange casing which forms a wall between the two chambers.

In a typical spring brake, a barrel-shaped power spring is used to store energy and to exert the large force required for braking in the event of air pressure failure. Air pressure acting on a diaphragm is employed to compress the spring and maintain it in its brake release position. When the air is exhausted, the spring acts on the diaphragm, typically a elastomeric diaphragm or a piston, and through an actuating rod exerts the spring force on the service push rod to apply the brakes in the event of a failure of the system air pressure.

The spring brake actuator operates within the spring chamber, which is typically formed by clamping an elastomeric diaphragm between a head (sometimes also known as a spring housing or spring chamber) and the adapter. The power spring is typically compressed within the spring chamber between the head and the diaphragm. The spring has a high spring constant and typically weighs 3 pounds or more, being compressed to a linear length of less than 3 inches from an original uncompressed length in an extended condition of from 9 to 12 inches. With a high spring constant, the spring has a substantial amount of potential energy, exerting a force on the head of from 2,000 to 3,000 pounds.

Various approaches have been heretofore proposed for sealing the brake actuator head to the adapter to prevent disassembly of the two parts. In U.S. Pat. No. 4,565,120, a safety restraint comprises a sheet metal body having a notch which receives the flanges on the adapter. The notch is large enough to permit partial separation of the head from the adapter upon release of the clamp band. In U.S. Pat. No. 4,850,263, an annular lip on the head is spun over the flange on the adapter to capture and grip it. The head can be separated from the adapter only by deforming the lip. In Gummer et al. U.S. Pat. No. 4,960,036, a circular ring, U-shaped in cross section, partially surrounds an adapter flange and a head flange and is crimped at the ends to retain the ring in place.

SUMMARY OF THE INVENTION

The invention is directed to an improved clamp for securing a head to an adapter in a fluid-operated brake actuator to effectively inhibit the detachment of the head from the adapter, thus providing a tamper-resistant brake actuator. The fluid-operated brake actuator is the type having a head with a first annular flange, a flange case with a second annular flange, and an annular retaining member circumferentially extending about an interface between the first annular flange and the second annular flange to clamp the first and second annular flanges tightly together. The annular retaining member has a pair of radially inwardly protruding portions to engage the first and second annular flanges. The head and the flange case thus form a chamber in which a power spring is compressed. The force of the power spring tends to separate the head from the flange case.

According to the invention, an axial step is provided on either the first annular flange or the second annular flange or both. The step extends away from the interface and is discontinuous around the circumference of the flange on which it is disposed. An axial lip is provided on at least one of the radially inwardly protruding portions of the annular retaining member, with the lip extending toward the interface radially inwardly of the step. The lip also snugly engages the step. The annular retaining member is split and has a leading end and a trailing end so that the annular retaining member can be threaded onto the first and second annular flanges by introducing the lip on the leading end of the annular retaining member between portions of the step and then drawing the annular retaining member circumferentially around the interface until the lip on the trailing end is in clamping engagement with the step on the first annular flange.

In one aspect of the invention, the annular retaining member comprises a tab extending from the leading end toward and over the trailing end, and the tab is fixedly secured to the trailing end. The tab is fixed to the trailing end either by welding or mechanically by means of a screw, pin or rivet.

In another aspect of the invention, the annular retaining member includes means for grasping the leading end to draw the annular retaining member around the interface. Preferably, the grasping means comprises a hole in the annular retaining member adjacent the leading end.

In a further aspect of the invention, the fluid-operated brake actuator has an axial step extending away from the interface on both of the first and the second annular flanges. Both axial steps are discontinuous around the circumference of the respective annular flange. Both inwardly protruding portions of the annular retaining member have a lip extending toward the interface and each is disposed to engage the axial step on the respective annular flange.

In all aspects of the invention, the axial step can have a single discontinuity or multiple discontinuities around the circumference. Preferably, the discontinuity comprises a notch in the axial step. Alternatively, the discontinuity comprises a breakout portion of the step.

The invention is also directed to a method of joining a head to a flange case in a fluid-operated brake actuator with an elastomeric diaphragm interposed between them. The head has an annular rim and the flange case has an annular flange at an open end thereof. Either or both the annular rim and the annular flange has an axial step extending away from the diaphragm, with the axial step being discontinuous around the circumference. The diaphragm has a circumferential edge portion. In the method, the circumferential edge portion is placed against the annular rim in a circumferentially abutting relationship. The annular flange is also placed against the circumferential edge portion in a circumferentially abutting relationship. There is provided a retaining member having a channel defined by a first wall and a second wall. The first wall has a lip extending inwardly of the channel, and the retaining member has a leading end and a trailing end.

The leading end of the retaining member is introduced tangentially onto the annular rim and the annular flange at a discontinuity in the axial step or steps. The annular rim, the circumferential edge portion, and the annular flange are all received in the channel, and the lip is positioned radially inwardly of and in engagement with the axial step or steps. The leading end and the retaining member are then moved circumferentially about the annular rim and the annular flange at least 360 degrees so that the lip captures the step in clamping engagement. Preferably, the leading end and the trailing end are secured to each other. The securing may be by welding or mechanically by means of a screw. In the latter case, the head of the screw is preferably removed.

Preferably, the head and flange case are preloaded toward each other to facilitate the assembly process and the seal of the diaphragm.

BRIEF DESCRIPTION OF THE DRAWINGS

The invention will now be described with reference to the accompanying drawings in which.

DETAILED DESCRIPTION OF THE DRAWINGS

Figure 1:
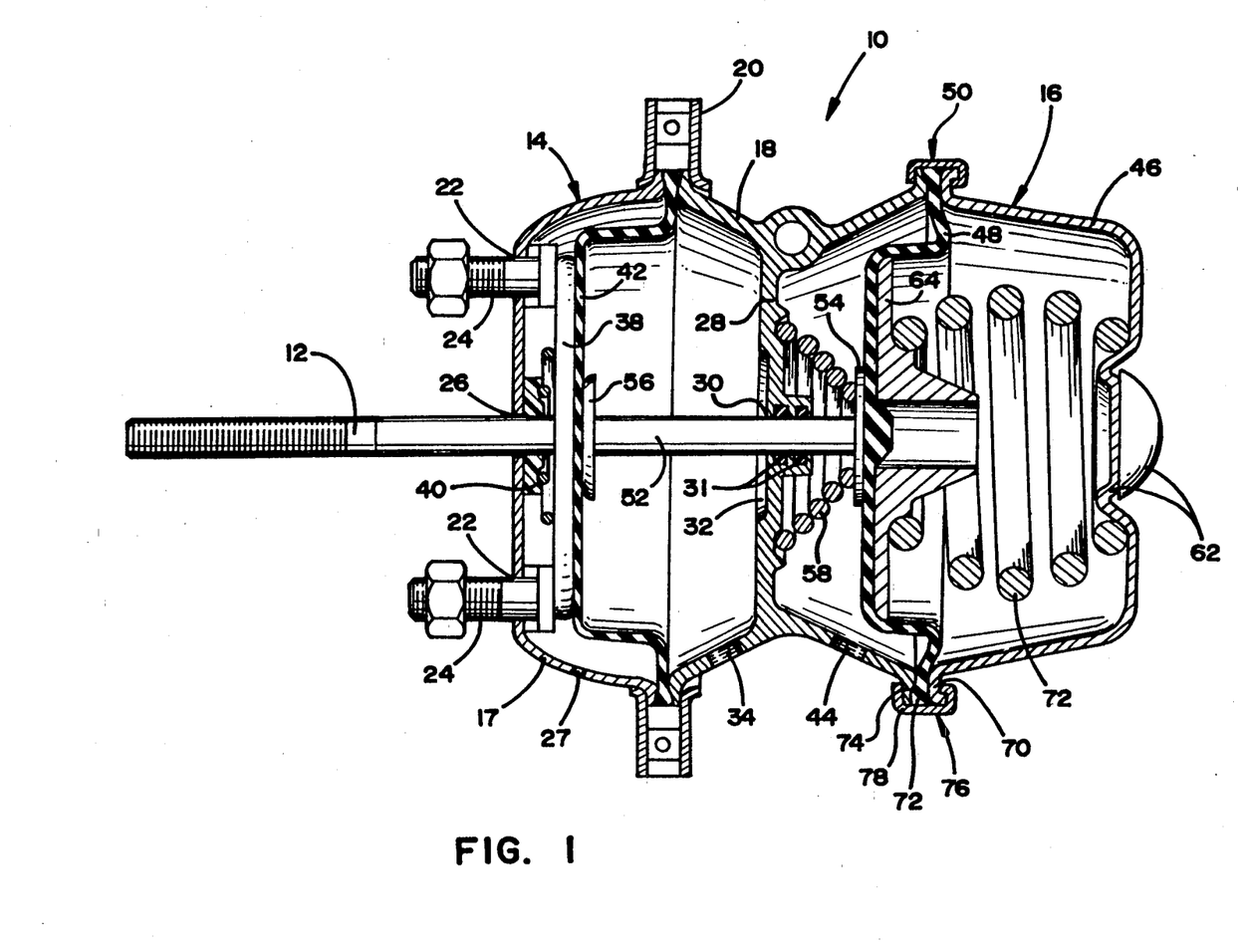
FIG. 1 shows a cross-sectional view of an air-operated combination diaphragm spring brake actuator.

Referring now to FIG. 1, there is shown a fluid-operated brake actuator 10 illustrating the environment in which the invention appears. The particular embodiment shown is an air-operated combination diaphragm spring brake actuator. The brake actuator is adapted to mount to a frame (not shown) of a vehicle and is further adapted to operate a brake (not shown) through a service push rod 12 which typically extends to and connects with a slack adjuster and the braking system of the vehicle.

The air-operated combination diaphragm spring brake comprises a service chamber 14 and a spring chamber 16 joined together in tandem. The service chamber 14 is defined by a cup-shaped service housing 17 and a double cup-shaped adapter 18 joined together through a clamp 20 to form a hollow interior chamber. The adapter 18 is sometimes also known as a flange case. A first elastomeric diaphragm 42 (also known as the service brake diaphragm) is clamped in fluid tight engagement between the service housing 17 and the service side of the adapter 18. Openings 22 are provided in the service housing 17 for bolts 24 which bolt the service housing 17 to the vehicle. A central opening 26 and one or more vent openings 27 are also provided in the service housing 17.

The adapter 18 forms a divider wall 28 and has a central opening 30 with one or more O-rings 31 positioned therein. An indentation or annular depression 32 is formed around the opening 30. An aperture 34 is provided in the adapter 18 for providing communication between a source of pressure (not shown) and the portion the service chamber 14 between the diaphragm 42 and the adapter 18 to permit the air to act upon the diaphragm in a manner to be described.

The service push rod 12 is mounted within the service chamber 14 for reciprocation within the central opening 26 and mounts a service push rod plate 38 at an inner end thereof. A service return spring 40 extends between a central portion of the service housing 17 and the service push rod plate 38 to bias the service push rod plate 38 and thus the service push rod 12 inwardly of the service chamber 14 to release the brake. The spring biased service push rod plate 38 normally forces the diaphragm 42 against the divider wall 28 on the service side of adapter housing 18 in the brake release position.

When air pressure is supplied through the aperture 34 as, for example, when the brakes are applied by a vehicle operator, air pressure is introduced between the diaphragm 42 and the divider wall 28, thereby forcing the diaphragm 42 toward the central portion of the service housing 17 (to the left as seen in FIG. 1). In this manner, the service push rod 12 is extended outwardly of the service chamber 14 as illustrated to apply braking pressure to the vehicle brakes in a conventional fashion.

The spring chamber 16 is defined by the spring side of the adapter 18 and a head 46 or spring housing which is clamped to the spring side of the adapter 18 through an annular clamp 50. It is the clamp 50 which forms the subject matter of the invention as will be hereinafter shown. A second elastomeric diaphragm 48 known as the spring diaphragm is clamped in fluid tight engagement between the spring side of adapter 18 and the head 46 by the clamp 50.

An aperture 44 is provided within the spring side of the adapter 18 to connect the spring chamber 16 with a source of pressure (not shown). An adapter push rod 52 is mounted within the adapter 18 to extend within the spring chamber 16 and has a reaction plate 54 rigidly mounted to one end, and a second reaction plate 56 mounted to the other end thereof. The adapter push rod 52 extends through the opening 30 and in sealing engagement with at least one O-ring 31. The reaction plate 56 seats within the annular depression 32 of the divider wall 28. An adapter return spring 58 is mounted within the spring chamber 16 between the divider wall 28 and the reaction plate 54 to bias the adapter push rod 52 into the release position.

A pressure plate 64 bears against the diaphragm 48. A power spring 72 is positioned between the pressure plate 64 and the head 46 to bias the pressure plate 64 and the push rods to a brake actuating position as viewed in FIG. 1. The adapter 18 is typically cast aluminum and the head 46 is typically stamped or spun low-carbon steel.

A release tool (not shown) can be provided within a central opening 62 of the head 46 for mechanically drawing the pressure plate 64 into a retracted or "caged" position in the event there is a need to mechanically release the brake. The release tool typically comprises a threaded rod having a nut threaded on the end thereof and a washer which bears against the outer surface of the head 46. Projections on the end of the threaded rod are selectively engageable with portions of the pressure plate 64 in a manner well known in the spring brake field.

In operation, air pressure is continually supplied to the spring chamber 16 through the aperture 44 to maintain the spring diaphragm 48 in a position to compress the power spring 72. In this position, the service push rod 12 normally will be operated as described above by selective pressurization of air into the service chamber 14 through the aperture 34. However, in the event of failure of the air pressure system, the pressure in the spring chamber 16 will be decreased so that the service return spring 40 and adapter return spring 58 would no longer be able to overcome the pressure of the much larger and stronger power spring 72. Thus, the pressure plate 64 forces the spring diaphragm 48, and thus the adapter push rod 52 outwardly, thereby also forcing the service push rod 12 outwardly to apply braking pressure to the brakes.

The clamp 50 which secures the head 46 to the adapter 18 is seen in cross section in FIG. 1. It can be seen that the head has an annular rim 70 which is in confronting relationship to a circumferential peripheral edge 72 of the spring diaphragm 48. In addition, the adapter 18 has an annular flange 74 which stands in confronting relationship to the circumferential peripheral edge 72 of the diaphragm 48. The confronting relationship of the annular rim 70, the circumferential peripheral edge 72, and the annular flange 74 forms an interface 76 among the respective components about which an annular retaining member 78 is clamped in secure relationship.

The detailed structure of the clamp 50 and its method of formation are more clearly illustrated in FIGS. 2 through 7. Looking more closely at FIG. 6, it can be seen that the head 46 has an axial step 80 extending away from the interface 78. The annular retaining member 78 has a pair of radially inwardly protruding portions 82, 84 which engage, respectively, the annular rim 70 and the annular flange 74. One of the inwardly protruding portions 82 comprises an axial lip 86 extending toward the interface 78 and tightly engaging the axial step 80. The other of the inwardly protruding portions 84 is substantially straight and abuts a flat surface 87 in the annular flange 74. The flat surface 87 and the other inwardly protruding portion 84 are disposed in a substantially radial plane relative to the head 46 and the adapter 18.

Figure 7:
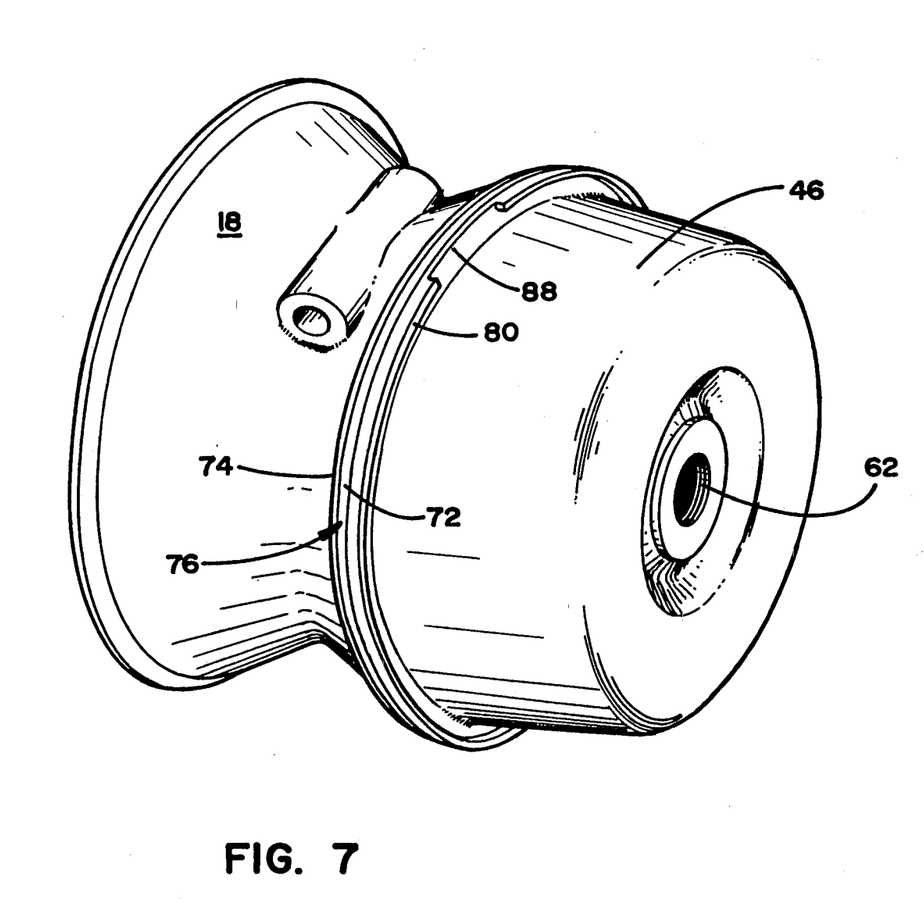
FIG. 7 is a plan view of the components of FIG. 2 prior to the introduction of the clamp ring.

Looking now at FIG. 7, it can be seen that axial step 80 on the annular rim 70 is annular in that it extends mostly around the circumference of the annular rim 70. However, a discontinuity in the form of a notch 88 is provided in the step 80. The notch 88 may be a clearly defined discontinuity, as shown, or it may simply be a narrowing of the step 80 such as would occur if the step 80 were ground down. The notch 88 or discontinuity must be dimensioned to permit the lip 86 or the retaining member 78 to be inserted between adjoining portions of the step 80 and moved beneath the step in a manner to be described. It will be understood that there is at least one, but may be more, discontinuity in the axial step 80. For example, the step 80 can be a series of spaced steps around the periphery of the annular rim 70.

Figures 3, 4:
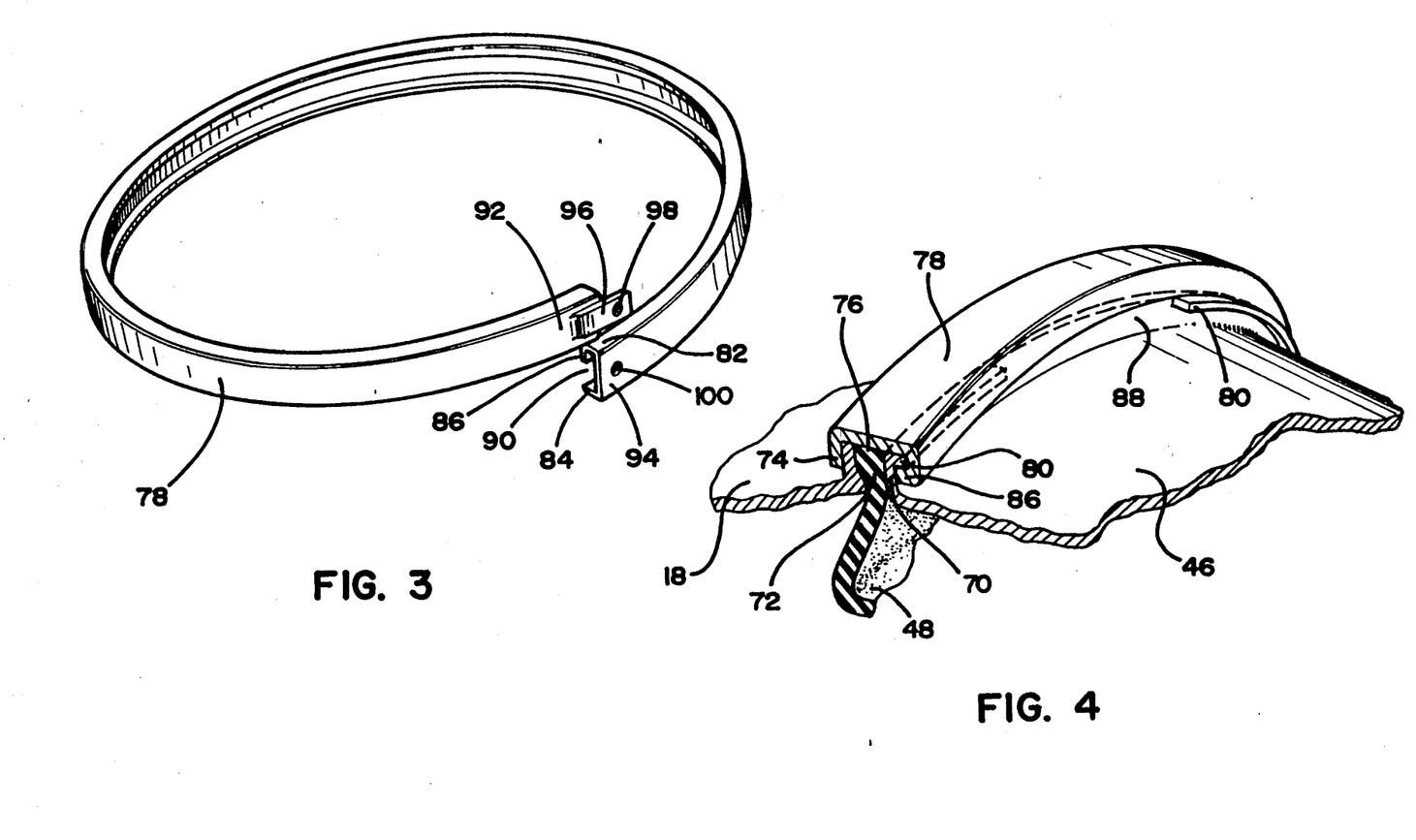
FIG. 3 is a perspective view of the clamping ring used in the formation of the spring chamber.
FIG. 4 is an enlarged partially sectional view showing the introduction of the clamp band onto the flanges.

Looking now at FIG. 3, it can be seen that the annular retaining member 78 is formed in a helical shape extending through approximately 360 degrees. The radially inwardly protruding portions 82, 84 are spaced from each other to define a channel 90, and the lip 86 extends inwardly of the channel 90. It can be seen that the annular retaining member 78 is essentially a helical split ring, having a leading end 92 and a trailing end 94. A tab 96 extends in the direction of the channel 90 away from the leading end 92 and has an aperture 98 extending therethrough. A second aperture 100 is provided in the body of the retaining member 78 near the trailing end 94.

Figure 2:
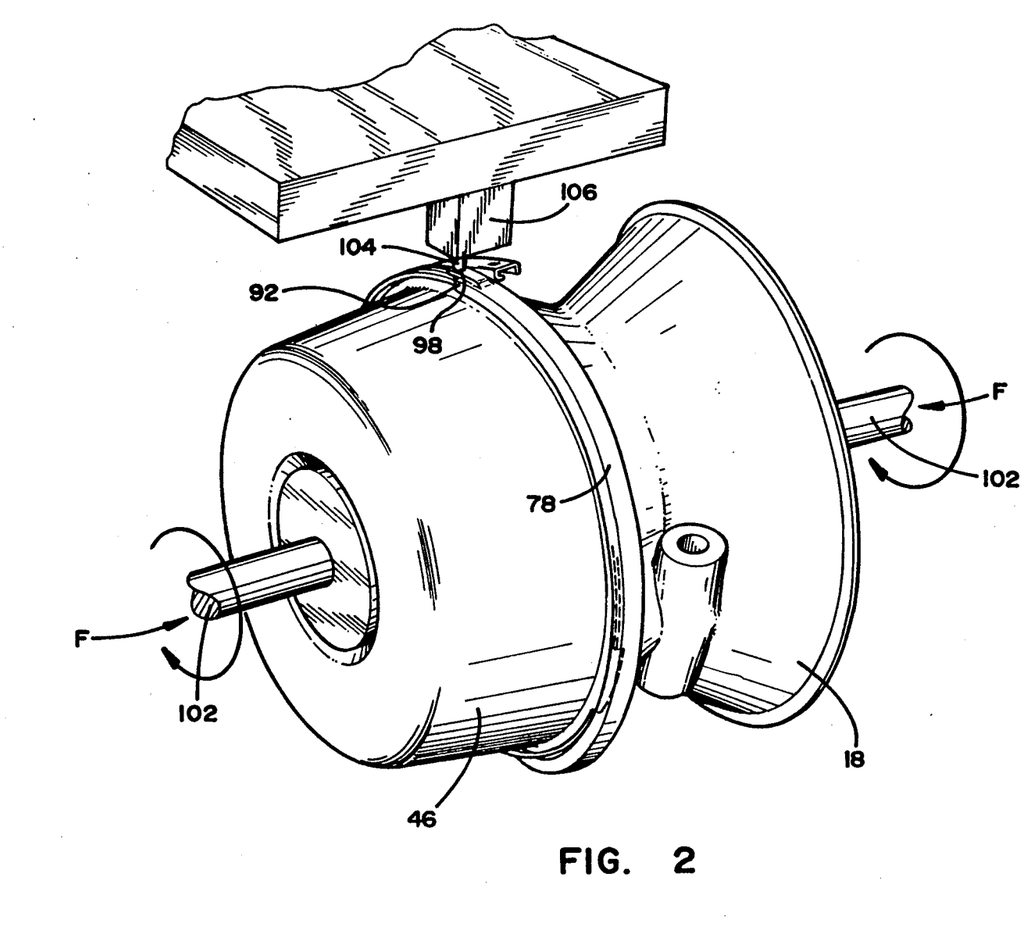
FIG. 2 is an elevational view of a portion of the actuator shown in FIG. 1 and showing a method of forming the spring chamber according to the invention.

FIGS. 2 and 4 illustrate the formation of the clamp 50 on the brake actuator. The adapter 18 and the head 46 are each mounted to a rotatable spindle 102 with the elastomeric diaphragm 48 disposed therebetween to form the interface 76. Axial force (represented by the letter "F" in FIG. 2) is typically applied to the head 46 and the adapter 18 to preload or compress the diaphragm 48 therebetween. The axial preload force can vary over a wide range, but generally is in excess of 1500 pounds and preferably in the range of 2000 to 5000 pounds. The annular retaining member 78 is placed over the head 46 in a position where the leading end 92 can be introduced tangentially onto the annular rim 70 and the annular flange 74 at the notch 88. The aperture 98 receives a pin 104 which is mounted to a stationary fixture 106. The spindles 102 are then rotated in the direction indicated in FIG. 2 to rotate the head 46 and the adapter 18 so that the preloaded interface 76 is fed into the channel 90 of the annular retaining member 78, in effect threading the annular retaining member 78 onto the annular rim 70 and annular flange 74. As the interface 76 is fed into the channel 90, it can be seen that the lip 86 of the annular retaining member 78 captures the axial step 80 of the head 46 in tight clamping engagement to maintain the circumferential peripheral edge 72 of the diaphragm 48 clamped between the annular rim 70 and the annular flange 74. Rotation of the spindle 102 continues through at least 360 degrees until the annular retaining member 78 is completely pulled onto the annular rim 70 and the annular flange 74 so that the lip 86 on the trailing end 94 is in tight clamping engagement with the adjoining step 80. It will be understood that the clamp 50 could be equivalently formed by fixing the spindles 102 and thus the head 46 and the adapter 18 and pulling the leading end 92 of the annular retaining member 78 at least 360 degrees around the interface 76.

Once the annular retaining member 78 is threaded around the interface 76, it is difficult to unthread and remove the retaining member 78. Unthreading would require introducing either the leading end 92 or the trailing end 94 into the notch 88 and rotating the head and adapter with respect to the retaining member 78. Any such removal would ordinarily require a preload on the head and adapter.

Figure 5:
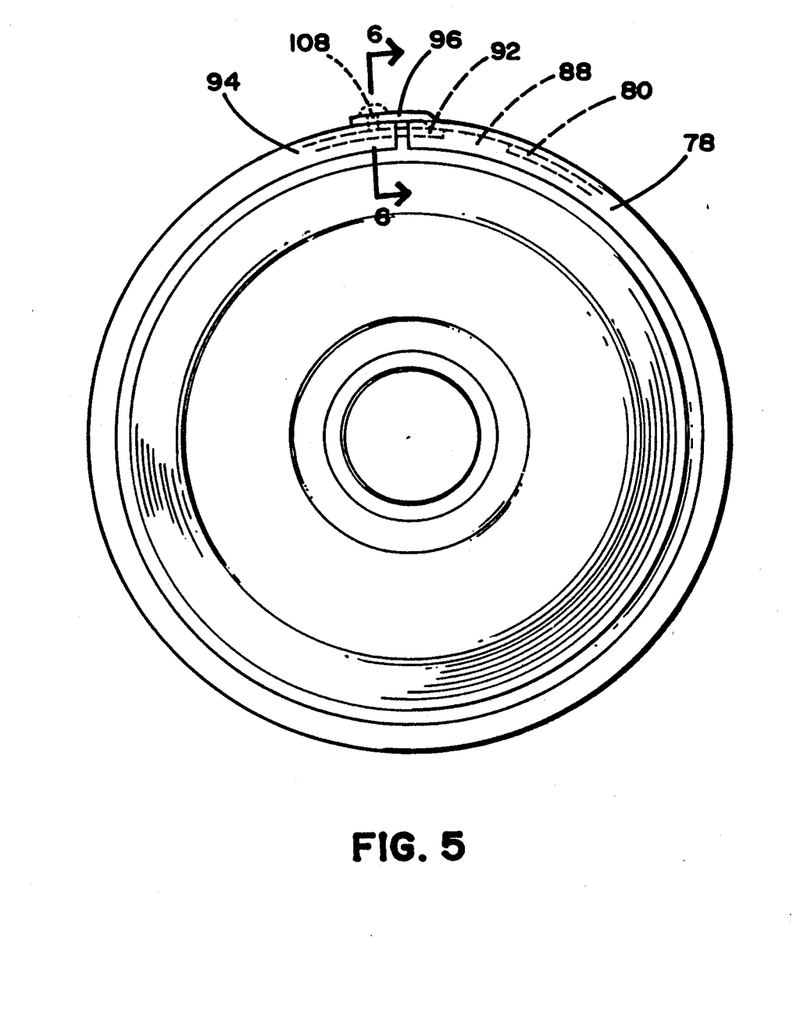
FIG. 5 is an end view of an air-operated combination diaphragm spring brake actuator taken along the line 5—5 of FIG. 1.
Figure 6:
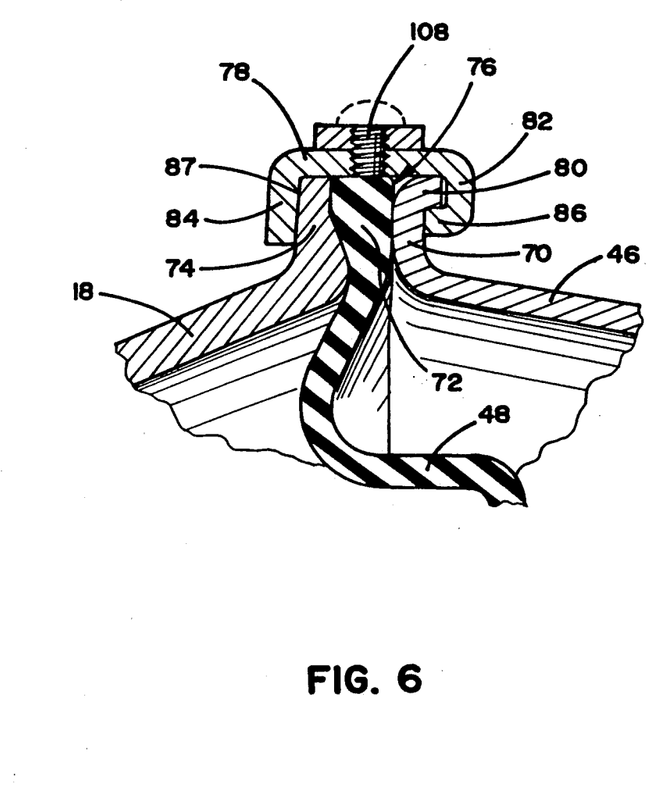
FIG. 6 is a cross-sectional view taken along line 6-6 of FIG. 5.

It is preferable to secure the leading end 92 to the trailing end 94 to make it more difficult for an unauthorized person in the field to unthread the annular retaining member 78 from the interface 76. A means of fixing the leading end 92 to the trailing end 94 is illustrated in FIGS. 5 and 6. As shown in FIG. 5, the annular retaining member 78 is preferably pulled circumferentially around the interface 76 so that the leading end 92 and trailing end 94 are disposed angularly at least several degrees from the notch 88. The leading end 92 and trailing end 94 can abut each other or can be spaced from each other. Preferably, the tab 96 extends over the trailing end 94 to lay against the surface of the annular retaining member 78. There, the tab 96 can be spot welded to the annular retaining member 78 or, as illustrated in FIG. 6, can be mechanically attached by a fastener. The fastener preferably comprises a hardened self-tapping screw 108 which, after installation, has its head removed.

Figure 8:
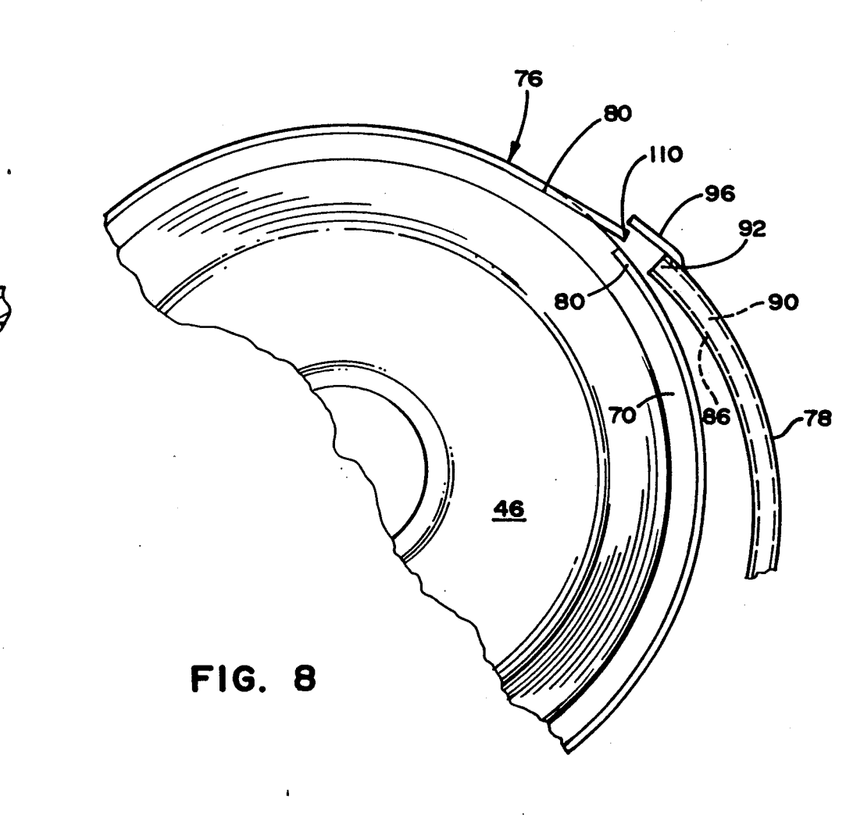
FIG. 8 is an end view of an alternative embodiment of the head casing prior to introduction of the clamp ring.

FIG. 8 illustrates another embodiment of the invention wherein the discontinuous axial step 80 on the annular rim 70 has a breakout portion 110 instead of a notch. The breakout portion 110 has a free end 112 which is separated from an adjoining portion of the axial step 80 and is displaced radially outwardly therefrom. The annular retaining member 78 is inserted onto the annular rim 70 and the annular flange 74 by inserting the breakout 110 within the channel 90 at the leading end 92 of the annular retaining member 78 so that the lip 86 captures the breakout 110. The breakout 110 thus guides the lip 86 and the following retaining member 78 over the interface 76 in the manner described above.

Figure 9:
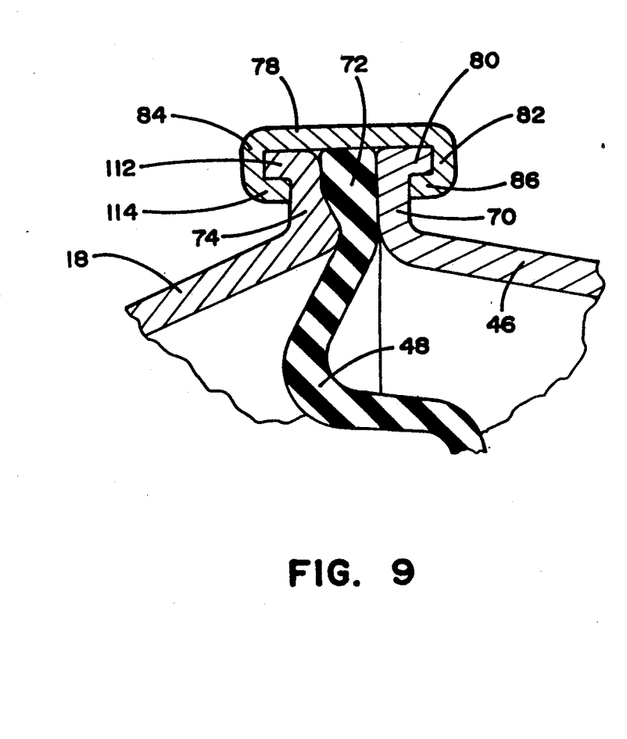
FIG. 9 is a cross-sectional view of an alternative embodiment of the flange construction.

In yet another embodiment of the invention, as illustrated in FIG. 9, the adapter can also be provided with an axial step 112 instead of a flat surface 87. The axial step 112 on the annular flange 74 also includes a discontinuity comprising either one or more notches as illustrated in FIG. 7 or a breakout as illustrated in FIG. 8. Similarly, the annular retaining member 78 has a second lip 114 which captures the axial step 112 in clamping engagement as the annular retaining member 78 is drawn over the interface 76. It will be understood that an axial step 112 can be formed on the annular flange 74 in lieu of or in addition to the step 80 on the annular rim 70. In any case, a corresponding lip must be formed on each of the inwardly protruding portions 82, 84 to accommodate the lip or lips.

The annular retaining member 78 can be inexpensively formed by roll forming sheet metal stock to form the cross-sectional shape and bending the thus formed shape into the helical form. The sheet metal stock can also be stamped. Alternatively, a ring of metal can be spun into the appropriate cross-sectional shape then cut across the circumference and bent slightly to form the helical shape. The retaining member can be made from a suitable deformable sheet metal such as aluminum alloy and low-carbon steel, or of a spring steel configuration.

It will be appreciated that the trailing end 94 need not necessarily be secured to the leading end 92. The force of the power spring 72 (and air pressure in the spring chamber when the brake is operational) tends to separate the head 46 from the adapter 18. Consequently, force is applied laterally against the radially inwardly protruding portions 82, 84 of the annular retaining member 78. The resistance to this force provided by the inwardly protruding portions 82, 84, coupled with the tight engagement of the lip 86 with the step 80 makes it difficult to inadvertently loosen the clamp 50 resulting in the separation of the head 46 from the adapter 18. It will be appreciated further that the trailing end 94 can be simply butt welded to the leading end 92 to further deter withdrawal of the annular retaining member 78 from the assembly. The invention thus provides an effective tamper-resistant brake actuator.

Reasonable variation and modification are possible within the scope of the foregoing disclosure and drawings without departing from the spirit of the invention, as defined in the accompanying claims.

The embodiments of the invention in which an exclusive property or privilege is claimed are as follows:

1. In a fluid-operated brake actuator of the type having a head with a first annular flange, a flange case with a second annular flange, an annular retaining member circumferentially extending about an interface between the first annular flange and the second annular flange to clamp the first and second annular flanges tightly together and form a chamber, said annular retaining member having a pair of radially inwardly protruding portions to engage the first and second annular flanges, and a power spring compressed within the chamber, the force of said power spring tending to separate the head from the flange case, the improvement comprising:

an axial step on at least one of said first and second annular flanges extending away from said interface, said step being discontinuous around the circumference of said at least one of the first and second annular flanges, an axial lip on at least one of said radially inwardly protruding portions of the annular retaining member, said lip extending toward the interface radially inwardly of the step in snug engagement therewith, said annular retaining member being split and having a leading end and a trailing end, whereby said annular retaining member is threaded onto said first and second annular flanges by introducing said lip on the leading end of the annular retaining member between portions of the step and drawing the annular retaining member circumferentially around the interface until the lip on the trailing end is in clamping engagement with the step on said first annular flange.

2. A fluid-operated brake actuator according to claim 1 wherein said annular retaining member comprises a tab extending from said leading end toward and over the trailing end, said tab being fixedly secured to the trailing end.

3. A fluid-operated brake actuator according to claim 2 wherein the tab is fixed to the trailing end by welding.

4. A fluid-operated brake actuator according to claim 2 wherein the tab is fixed to the trailing end by a screw.

5. A fluid-operated brake actuator according to claim 1 wherein the annular retaining member includes means for grasping the leading end to draw the annular retaining member around the interface.

6. A fluid-operated brake actuator according to claim 5 wherein the grasping means comprises a hole in the annular retaining member adjacent the leading end.

7. A fluid-operated brake actuator according to claim 1 wherein both of said first and second annular flanges have an axial step extending away from the interface, both of said axial steps being discontinuous around the circumference of the annular flanges, and both inwardly protruding portions of the annular retaining member have a lip extending toward the interface and disposed to engage the axial steps on the respective annular flanges.

8. A fluid-operated brake actuator according to claim 1 wherein said axial step has a single discontinuity around the circumference of the at least one annular flange.

9. A fluid-operated brake actuator according to claim 8 wherein the discontinuity comprises a notch in the axial step.

10. A fluid-operated brake actuator according to claim 8 wherein the discontinuity comprises a break out portion of the step.

11. A fluid-operated brake actuator according to claim 1 wherein said axial step has multiple discontinuities around the circumference of the at least one of the first and second annular flanges.

12. A method of joining a head to a flange case in a fluid-operated brake actuator with an elastomeric diaphragm interposed therebetween, said head having an annular rim, said flange case having an annular flange at an open end thereof, at least one of said annular rim and annular flange having an axial step, discontinuous around the circumference thereof and extending away from said diaphragm, and said diaphragm having a circumferential edge portion, comprising the steps of:
    placing the circumferential edge portion against the annular rim in a circumferentially abutting relationship,
    placing the annular flange against the circumferential edge in a circumferentially abutting relationship,
    providing a retaining member having a channel defined by a first wall and a second wall, said first wall having a lip extending inwardly of the channel, said retaining member having a leading end and a trailing end,
    introducing the leading end of the retaining member tangentially onto the annular rim and the annular flange at a discontinuity in the axial step, with the annular rim, the circumferential edge portion, and the annular flange being received in the channel and the lip positioned radially inwardly of and in engagement with the axial step, and
    moving the leading end and the retaining member circumferentially about the annular rim and annular flange at least 360 degrees so that the lip captures the step in clamping engagement.

13. The method according to claim 12 further comprising the step of securing the leading end to the trailing end.

14. The method according to claim 13 wherein the leading end is secured to the trailing end by welding.

15. The method according to claim 12 wherein the leading end is secured to the trailing end by a screw and further comprising the step of removing the head of the screw.

16. The method according to claim 12 wherein the annular retaining member is held fixed and the head, diaphragm and flange case are rotated with respect to the annular retaining member.

17. The method according to claim 12 and further comprising the step of applying a preload force against the head and the flange case to clamp the annular rim and the annular flange toward each other before the step of introducing the leading edge of the retaining member onto the annular rim.

18. The method according to claim 12 wherein the axial preload force is in excess of 1500 pounds.

* * * * *